(12) United States Patent
Wood et al.

(10) Patent No.: US 6,942,814 B2
(45) Date of Patent: Sep. 13, 2005

(54) METHODS OF FORMING INTEGRATED OPTOELECTRONIC DEVICES

(75) Inventors: Robert L. Wood, Cary, NC (US); Edward A. Hill, Chapel Hill, NC (US)

(73) Assignee: Memscap, S.A. (FR)

( * ) Notice: Subject to any disclaimer, the term of this patent is extended or adjusted under 35 U.S.C. 154(b) by 272 days.

(21) Appl. No.: 10/307,771

(22) Filed: Dec. 2, 2002

(65) Prior Publication Data

US 2003/0117679 A1 Jun. 26, 2003

Related U.S. Application Data

(62) Division of application No. 09/511,928, filed on Feb. 23, 2000, now Pat. No. 6,535,318.
(60) Provisional application No. 60/165,317, filed on Nov. 12, 1999.

(51) Int. Cl.[7] .......................... H01L 21/00; B29D 11/00; G02B 26/08
(52) U.S. Cl. .............. 216/24; 216/2; 216/17; 216/18; 216/66; 259/224
(58) Field of Search ...................... 216/2, 17, 18, 216/66, 24; 359/224

(56) References Cited

U.S. PATENT DOCUMENTS

| | | | |
|---|---|---|---|
| 5,071,510 A | 12/1991 | Findler et al. | 156/647 |
| 5,148,604 A | 9/1992 | Bantien | 33/366 |
| 5,242,533 A | 9/1993 | Trah et al. | 156/628 |

(Continued)

OTHER PUBLICATIONS

Clerc et al., "Advanced Deep Reactive Ion Etching: A Versatile Tool for Microelectromechanical Systems," J. Micromech. Microeng. 8, 1998 pp. 272–278.

Marxer et al, "Vertical Mirrors Fabricated by Deep Reactive Ion Etching For Fiber–Optic Switching Applications," Journal of Microelectromechanical Systems, vol. 6, No. 3, Sep. 1997.

Marxer et al., "Vertical Mirrors Fabricated by Reactive Ion Etching For Fiber Optical Switching Applications," IEEE, 1997, pp. 49–54.

Toshiyoshi, "Micromachined Polysilicon Torsion Mirrors for an Electrostatic Optical Switch in a Free Space," SPIE, vol. 3321, 1998, pp. 556–561.

*Primary Examiner*—Shamim Ahmed
(74) *Attorney, Agent, or Firm*—Myers Bigel Sibley & Sajovec (57) ABSTRACT

Methods of forming optoelectronic devices include forming an electrically conductive layer on a first surface of a substrate and forming a mirror backing layer from the electrically conductive layer by forming an endless groove that extends through the electrically conductive layer. A step is then performed to remove a portion of the substrate at a second surface thereof, which extends opposite the first surface. This step exposes a front surface of the mirror backing layer. An optically reflective mirror surface is then formed on the front surface of the mirror backing layer.

49 Claims, 10 Drawing Sheets

U.S. PATENT DOCUMENTS

| | | | |
|---|---|---|---|
| 5,295,014 A | 3/1994 | Toda | 359/202 |
| 5,579,148 A | 11/1996 | Nishikawa et al. | 359/214 |
| 5,579,149 A | 11/1996 | Moret et al. | 359/223 |
| 5,579,151 A | 11/1996 | Cho | 359/291 |
| 5,719,073 A | 2/1998 | Shaw et al. | 437/228 |
| 5,761,350 A | 6/1998 | Koh | 385/14 |
| 5,781,331 A | 7/1998 | Carr et al. | 359/288 |
| 5,793,519 A | 8/1998 | Furlani et al. | 359/291 |
| 5,846,849 A | 12/1998 | Shaw et al. | 438/52 |
| 5,847,454 A | 12/1998 | Shaw et al. | 257/734 |
| 5,867,302 A | 2/1999 | Fleming | 359/291 |
| 5,880,921 A | 3/1999 | Tham et al. | 361/233 |
| 5,903,380 A | 5/1999 | Motamedi et al. | 359/224 |
| 5,905,007 A | 5/1999 | Ho et al. | 430/22 |
| 5,910,856 A | 6/1999 | Ghosh et al. | 359/291 |
| 5,914,801 A | 6/1999 | Dhuler et al. | 359/230 |
| 5,920,417 A | 7/1999 | Johnson | 359/223 |
| 5,943,155 A | 8/1999 | Goossen | 359/247 |
| 6,014,240 A | 1/2000 | Floyd et al. | 359/201 |
| 6,201,629 B1 | 3/2001 | McClelland et al. | 359/223 |
| 6,233,088 B1 | 5/2001 | Roberson et al. | 359/291 |
| 6,275,320 B1 | 8/2001 | Dhuler et al. | 359/237 |
| 6,478,975 B1 * | 11/2002 | Ju | 216/6 |
| 6,800,210 B2 * | 10/2004 | Patel et al. | 216/2 |

* cited by examiner

METHODS OF FORMING INTEGRATED OPTOELECTRONIC DEVICES

CROSS-REFERENCE TO RELATED APPLICATION

This application is a divisional of U.S. application Ser. No. 09/511,928, filed Feb. 23, 2000 now U.S. Pat. No. 6,535,318, which claims priority to U.S. Provisional Application Ser. No. 60/165,317, filed Nov. 12, 1999.

FIELD OF THE INVENTION

The present invention relates to optoelectronic devices and methods of forming and operating same and, more particularly, to optoelectronic devices that utilize reflective surfaces to direct optical energy and methods of forming and operating same.

BACKGROUND OF THE INVENTION

Micro-electromechanical (MEM) devices having mirrors therein have been proposed for directing optical beams across an optoelectronic substrate. Such devices are useful in a wide variety of applications ranging from displays to photonic NxN switches. Such devices are disclosed in U.S. Pat. No. 5,903,380 to Motamedi et al. entitled "Micro-Electromechanical (MEM) Optical Resonator and Method". In particular, the '380 patent to Motamedi et al. discloses an integrated micro-electromechanical optical resonator that comprises a cantilever beam which is fixed to a substrate at one end and extends freely over the substrate at the other end. A bimorph actuator is also provided and is stacked on top of the beam at its fixed end. A reflective surface also partially covers the top of the beam at its free end. The bimorph actuator comprises material layers having different thermal expansion coefficients. A DC-biased AC voltage connected across the actuator causes it to heat and cool as the current passing through it increases and decreases. This creates a thermal bimorph effect which causes the cantilever beam and the reflective surface to oscillate in accordance with the varying current. Combining the resonator with a light source and actuator excitation circuitry creates an optical scanner engine which delivers a scan angle in excess of 20 degrees and a high scan rate. Unfortunately, the mirror surface provided on the cantilever beam of the '380 patent may not have near diffraction-limited optical quality because the cantilever beam may become warped or otherwise distorted in response to the bimorph effect.

U.S. Pat. No. 5,867,302 to Fleming entitled "Bistable Micro-electromechanical Actuator" also discloses a MEM device having mirrors therein. In particular, the '302 patent discloses a MEM actuator that is formed on a substrate and includes a stressed membrane of generally rectangular shape that upon release assumes a curvilinear cross-sectional shape due to attachment at a midpoint to a resilient member and at opposing edges to a pair of elongate supports. The stressed membrane can be electrostatically switched between a pair of mechanical states having mirror-image symmetry, with the MEM actuator remaining in a quiescent state after a programming voltage is removed. The bistable MEM actuator according to various embodiments of the present invention can be used to form a nonvolatile memory element, an optical modulator (with a pair of mirrors supported above the membrane and moving in synchronism as the membrane is switched), a switchable mirror (with a single mirror supported above the membrane at the midpoint thereof) and a latching relay (with a pair of contacts that open and close as the membrane is switched). Arrays of bistable MEM actuators can also be formed for applications including nonvolatile memories, optical displays and optical computing. FIGS. 7a–7b of the '302 patent also disclose an embodiment of the MEM actuator that includes a rotatable mirror. Unfortunately, the process described in the '302 patent for forming a membrane upon which the rotatable mirror is supported is relatively complicated and may not be suitable with conventional microelectronic processing techniques. Thus, the devices disclosed in the '302 patent may not be readily integrated with electronic devices on conventional integrated circuit substrates.

Thus, notwithstanding the above-described MEM devices having mirrors therein, there continues to be a need for optoelectronic devices that can redirect optical beams and have near diffraction-limited optical quality and methods of forming and operating same that are compatible with conventional microelectronic device fabrication techniques.

SUMMARY OF THE INVENTION

It is therefore an object of the present invention to provide improved optoelectronic devices and methods of forming and operating same.

It is another object of the present invention to provide optoelectronic devices that can redirect optical beams and methods of forming and operating same.

It is still another object of the present invention to provide optoelectronic devices having movable reflective microstructures therein and methods of forming and operating same.

It is a further object of the present invention to provide optoelectronic devices having reflective microstructures therein with near diffraction-limited optical quality and methods of forming and operating same.

It is still a further object of the present invention to provide optoelectronic devices having optically reflective mirrors therein that can exhibit extreme flatness over apertures of up to several millimeters and methods of forming and operating same.

These and other objects, advantages and features of the present invention may be provided by optoelectronic devices that, according to one embodiment of the present invention, comprise a substrate having an opening therein that extends at least partially therethrough. A mirror having near diffraction-limited quality is also provided in the opening and is mechanically coupled to the substrate by a hinge so that the mirror can be rotated from a closed position to an open position. According to a preferred aspect of the invention, the mirror is formed from a monocrystalline silicon mirror backing layer having a thickness greater than about 10 μm and an optically reflective mirror surface on the backing layer. The mirror surface may comprise gold or aluminum, for example, and may be applied to the backing layer using an evaporation or sputtering technique. This monocrystalline silicon mirror backing layer is highly resistant to warping or other distortions caused when stresses are applied to it.

According to another preferred aspect of the present invention, the hinge comprises a polycrystalline silicon hinge that provides a mechanical and an electrical connection to the substrate. A layer of metal such as nickel is also provided on a back surface of the mirror backing layer so that an application of a sufficiently strong magnetic field to the opening will induce a force on the layer of metal that operates to pull the mirror backing layer to an upright position. An electrostatic polysilicon clamp electrode is also provided on the monocrystalline silicon mirror backing layer. This clamp electrode can be used advantageously to clamp the mirror in a closed position even if a sufficiently strong magnetic field is applied to the opening. Thus, a substrate having a plurality of individually controllable reflective microstructures (e.g., "pop-up" mirrors) can be provided in accordance with the present invention.

According to another embodiment of the present invention, preferred methods of forming optoelectronic devices include the steps of forming an electrically conductive layer on a first surface of a substrate and then forming a mirror backing layer from the electrically conductive layer by forming an endless groove that extends through the electrically conductive layer. The endless groove is preferably formed using a deep reactive ion etching (DRIE) technique, however, an anisotropic etching step may also be performing using an etchant such as KOH. A portion of the substrate at a second surface thereof is then removed to expose a front surface of the mirror backing layer. An optically reflective mirror surface can then be formed on the front surface of the mirror backing layer. The substrate may also comprise a supporting layer of monocrystalline silicon (e.g., silicon wafer) having a thickness of greater than about 100 μm and the step of removing a portion of the substrate may comprise the step of etching through the supporting layer of monocrystalline silicon using a deep reactive ion etching technique.

Methods according to the present invention also preferably include the step of forming a polysilicon hinge that is attached to a back surface of the mirror backing layer and is attached to the electrically conductive layer. The step of forming an optically reflective mirror surface also preferably comprises evaporating or sputtering a layer of gold or aluminum onto the front surface of the mirror backing layer. In order to enable magnetic actuation of the mirror backing layer, a layer of nickel is electroplated onto the back surface of the mirror backing layer. But, to inhibit magnetic actuation, the step of forming a polysilicon hinge also preferably comprises the step of forming a polysilicon electrostatic clamping electrode that is attached to the back surface of the mirror backing layer and overlaps the endless groove. The step of forming a polysilicon hinge and polysilicon clamping electrode is also preceded by the step of filling the endless groove with an electrically insulating layer by thermally oxidizing at least one sidewall of the mirror backing layer that is exposed by the endless groove. Any remaining opening in the groove may then be filled by depositing a phosphorus-doped silicate glass (PSG) layer into the groove and then planarizing the deposited layer to be flush with the back surface of the mirror backing layer.

DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. Also, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1A:
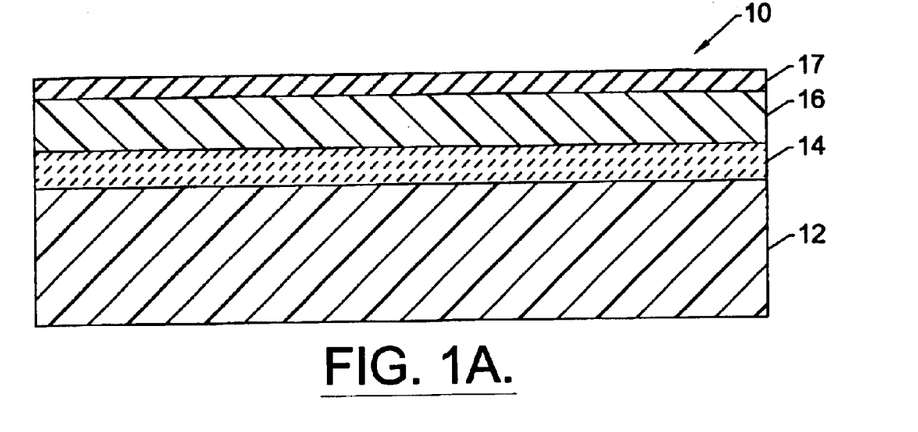
FIGS. 1A–1I are cross-sectional views of intermediate structures, taken along line 1–1' of FIG. 2, that illustrate preferred methods of forming optoelectronic devices having pop-up mirrors therein, according to a first embodiment of the present invention.

Referring now to FIGS. 1A–1I, preferred methods of forming optoelectronic devices having pop-up mirrors therein include the step of forming a silicon-on-insulator (SOI) substrate 10. As illustrated by FIG. 1A, the SOI substrate 10 may comprise a monocrystalline silicon wafer 12 having a thickness of greater than about 100 μm and an intermediate electrically insulating layer 14 on an upper surface of the silicon wafer 12. The intermediate electrically insulating layer 14 may be formed by thermally oxidizing the upper surface of the silicon wafer 12. The intermediate electrically insulating layer 14 preferably has a thickness in a range between about 0.1 μm and 0.5 μm. The SOI substrate 10 also preferably comprises an electrically conductive layer 16 of monocrystalline silicon having a thickness in a range between about 10 μm and 100 μm, and more preferably about 50 μm. This electrically conductive layer 16 may have a polished surface and this polished surface may be bonded to the intermediate electrically insulating layer 14 using conventional wafer bonding techniques, for example. Alternatively, the electrically conductive layer 16 may be formed on an upper surface of the intermediate electrically insulating layer 14 using epitaxial lateral overgrowth (ELO) techniques. A silicon nitride layer 17 having a thickness in a range between about 0.1 and 0.5 μm may also be formed on the electrically conductive layer 16.

Figure 1B:
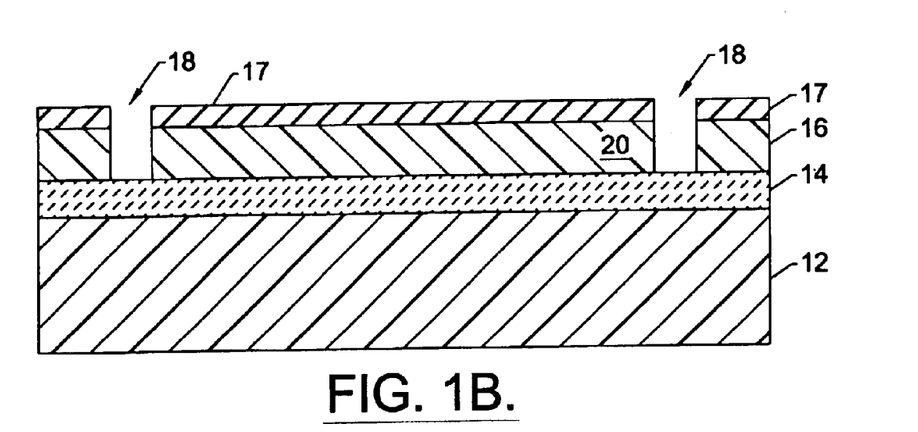
Figure 2:
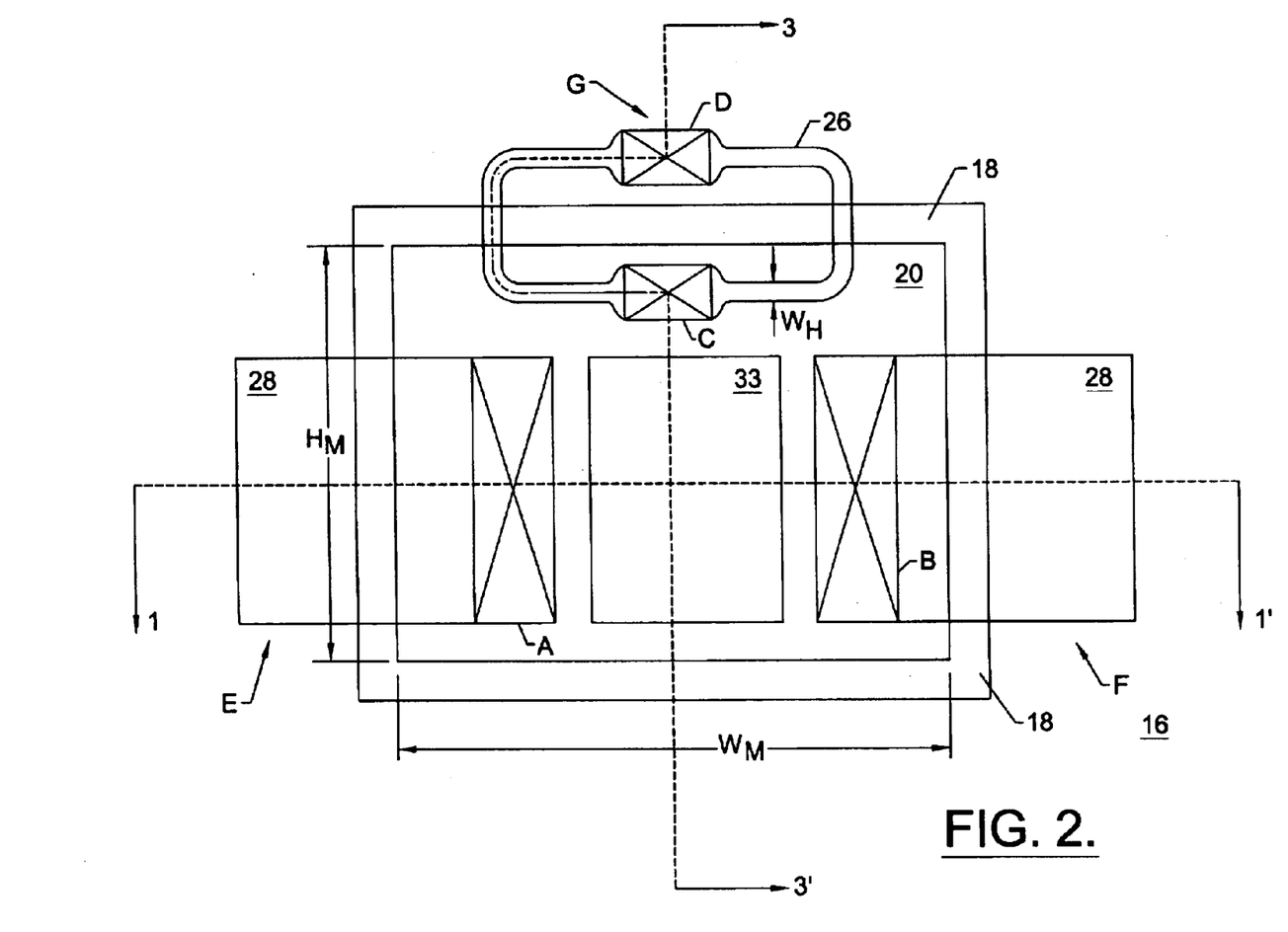
FIG. 2 is a plan layout schematic of an optoelectronic device having a pop-up mirror therein, according to the first embodiment of the present invention.

Referring now to FIGS. 1B and 2, a mirror backing layer 20 may be defined by forming an endless groove 18 that extends through the electrically conductive layer 16 and exposes the intermediate electrically insulating layer 14 which acts as an etch-stop layer. The mirror backing layer 20 may be defined as a rectangular-shaped layer having a width "$W_M$" of about 350 μm and a height "$H_M$" of about 250 μm when viewed in an open position. The endless groove 18 is preferably formed by selectively etching the electrically conductive layer 16 using a deep reactive ion etching (DRIE) technique that provides a high degree of selectivity and facilitates the formation of a groove 18 having a high aspect ratio. This DRIE technique can be performed using a DRIE tool, such as a Multiplex tool manufactured by Surface Technology Systems, Ltd. (see, http://www.stsystems.com/equip.html). Using this tool, a groove 18 having a width of 5 μm and a depth corresponding to the thickness of the electrically conductive layer 16 (e.g., 50 μm) can be formed. Alternatively, the endless groove 18 may at least be partially formed by an anisotropic etching step using a KOH etchant.

Figure 1C:
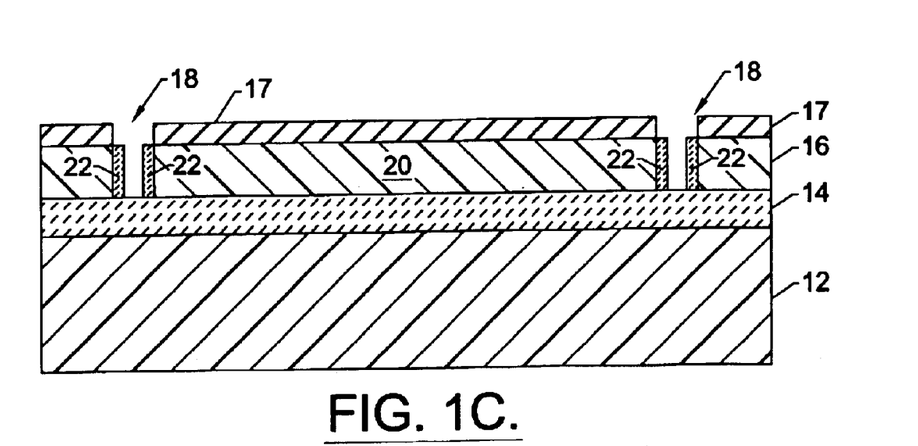

As illustrated by FIG. 1C, a step is then performed to narrow the effective width of the groove 18. This step is preferably achieved by performing a thermal oxidation step to selectively grow oxide spacers 22 on the exposed sidewalls of the electrically conductive layer 16 and the mirror backing layer 20 (using the silicon nitride layer 17 as a thermal oxidation mask). For a groove 18 having a width of about 5 μm, the oxide spacers 22 may be formed to have a thickness of about 2 μm. As will be understood by those skilled in the art, the formation of the oxide spacers 22 will cause the sidewalls of the electrically conductive layer 16 and the mirror backing layer 20 to become recessed since silicon atoms within these layers will be consumed during the thermal oxidation step. Thus, notwithstanding the fact that the oxide spacers may be formed to have a thickness of about 2 μm for a groove 18 having a width of 5 μm, the resulting width of the groove 18 after the thermal oxidation step will be greater than about 1 μm.

Figure 1D:
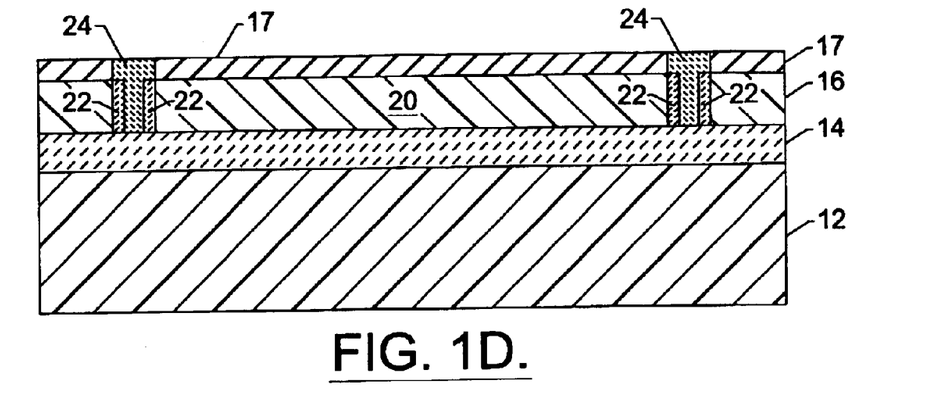

Referring now to FIG. 1D, a step is then performed to fill the remaining opening in the groove 18 with an electrically insulating material by depositing a blanket layer of phosphorus-doped silicate glass (PSG) on the structure of FIG. 1C. This blanket layer is then planarized to define a sacrificial insulating region 24 within the groove 18. In the event the oxide spacers 22 are not formed and a relatively thick PSG blanket layer is deposited into the groove 18, the planarization step may comprise a chemical-mechanical polishing (CMP) step.

Figure 1E:
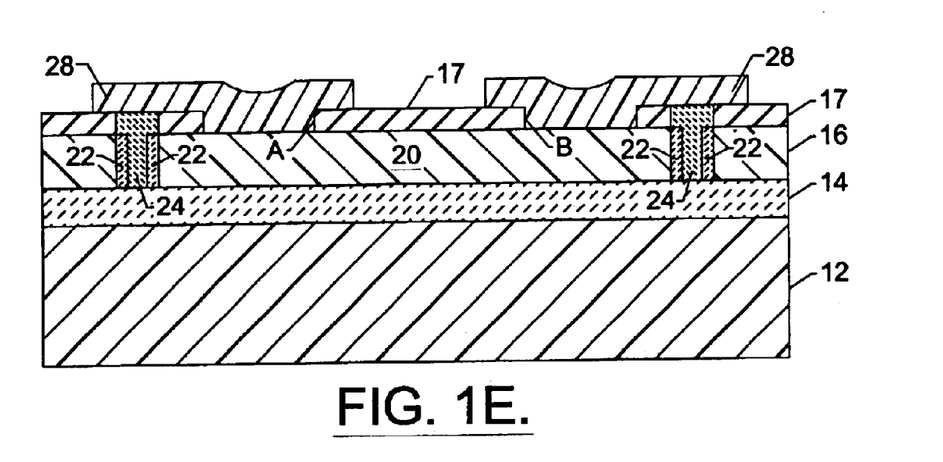
Figure 3:
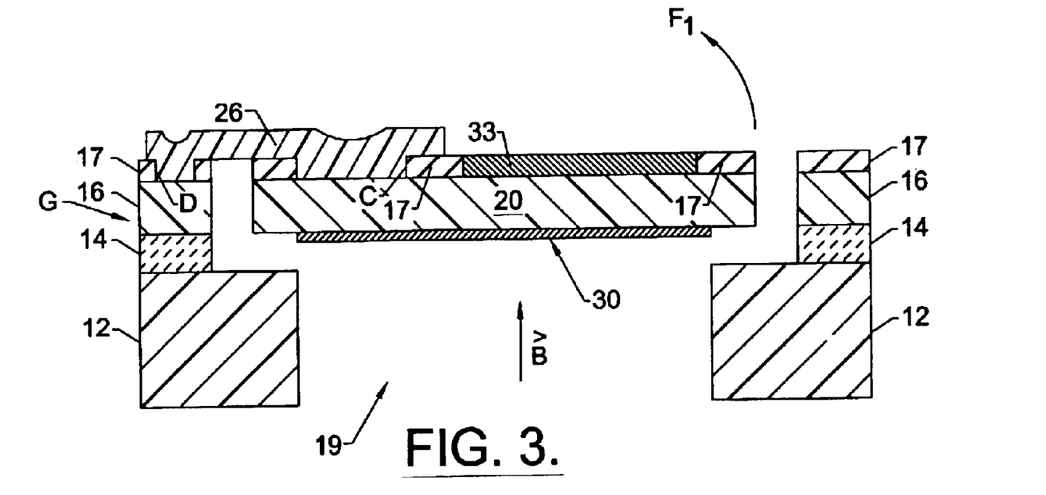
FIG. 3 is a cross-sectional view of the optoelectronic device of FIG. 2, taken along line 3–3'.

Referring now to FIGS. 1E and 2, a photolithographically defined etching step may then be performed to remove portions of the blanket silicon nitride layer 17 and thereby expose selected portions of a back surface of the mirror backing layer 20 (contact openings A, B and C) and expose a portion (contact opening D) of the electrically conductive layer 16 that extends adjacent the groove 18. Next, a blanket layer of polycrystalline silicon having a thickness in a range between about 1 μm and 3 μm (e.g., 2 μm) is deposited onto the silicon nitride layer 17 and onto the exposed portions of the surface of the electrically conductive layer 16 and back surface of the mirror backing layer 20. The blanket layer of polycrystalline silicon is then patterned to define a polysilicon hinge 26 and a pair of polysilicon electrostatic clamp electrodes 28. According to a preferred aspect of the present invention, the oxide spacers 22 and sacrificial insulating region 24 within the groove 18 provide support to the blanket layer of polycrystalline silicon during the deposition and patterning steps. The polysilicon hinge 26 may be patterned to have a width "$W_H$" of about 8–10 μm. As illustrated best by FIGS. 2–3, the polysilicon hinge 26 electrically and mechanically couples the mirror backing layer 20 to the electrically conductive layer 16.

Figure 1F:
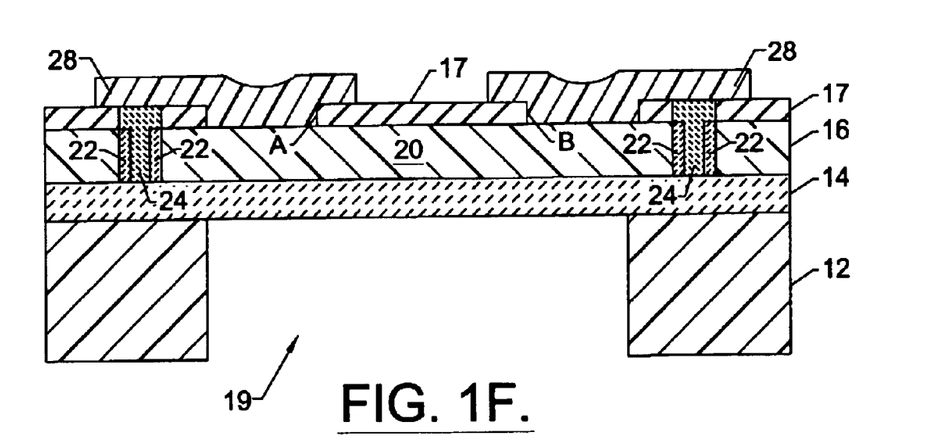

Referring now to FIG. 1F, a backside of the monocrystalline silicon wafer 12 is then etched using another deep reactive ion etching (DRIE) technique, to define an opening 19 in the monocrystalline silicon wafer 12 that exposes the intermediate electrically insulating layer 14. During this DRIE step, the intermediate electrically insulating layer 14 acts as an etch-stop layer. In order to provide mechanical support for the mirror backing layer 20, the size of the opening is preferably designed to be smaller than the size of the mirror backing layer 20 as defined by the groove 18. However, because the electrostatic clamping electrodes 28 may also provide a sufficient mechanical support to suspend the mirror backing layer 20 within the opening 19, the size of the opening may be designed to be equal to or larger than the mirror backing layer 20.

Figure 1G:
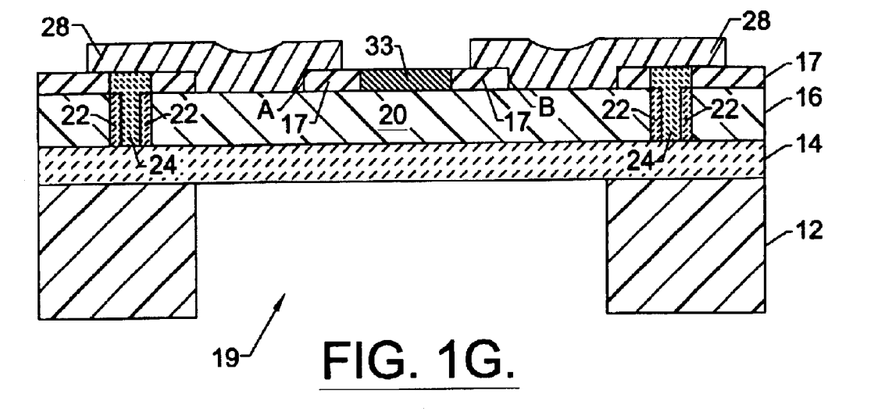

Then, as illustrated by FIGS. 1G and 2, another photolithographically defined etching step is performed on the silicon nitride layer 17, to expose the back surface of the mirror backing layer 20. This etching step is then followed by the step of electroplating a layer of nickel 33 having a thickness in a range between about 5 μm and 30 μm onto the exposed back surface of the mirror backing layer 20. Here, the etching mask that is used during etching of the silicon nitride layer 17 is also used as a mask during the electroplating step.

Figure 1H:
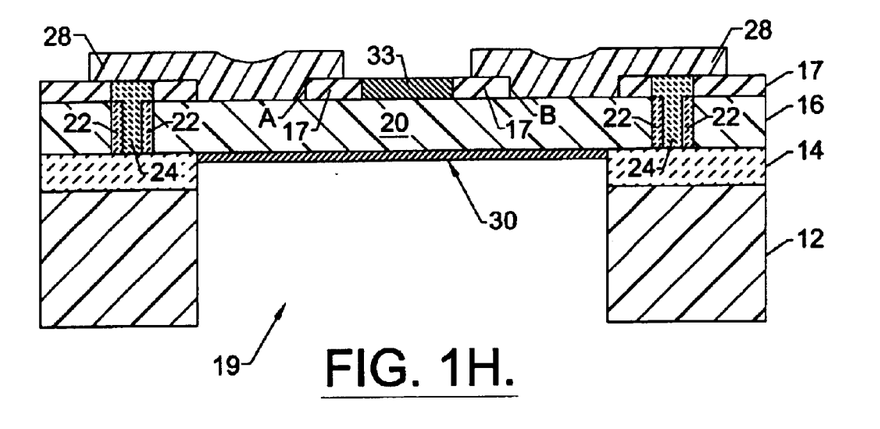
Figure 1I:
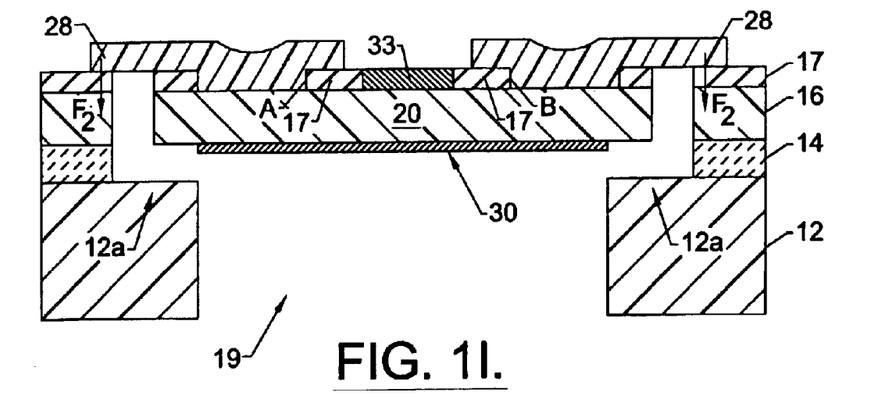

Referring now to FIG. 1H, a conventional etching step is then performed to remove the exposed portion of the intermediate electrically insulating layer 14 from the front polished surface of the mirror backing layer 20. An optically reflective mirror surface 30 is then formed on the front surface of the mirror backing layer 10. This mirror surface 30 may be formed by evaporating a layer of gold onto the front surface of the mirror backing layer 20. Alternatively, the mirror surface 30 may be formed by evaporating a layer of aluminum onto the front surface of the mirror backing layer 20. The mirror surface 30 may also be formed by sputtering a layer of gold or aluminum onto the front surface of the mirror backing layer 20. As will be understood by those skilled in the art, these techniques of evaporating or sputtering gold or aluminum to define the mirror surface 30 result in the formation of a mirror surface 30 that is self-aligned to the opening in the silicon wafer 12. The mirror backing layer 20 is then released by performing a selective etching step using the mirror surface 30 and silicon wafer 12 as an etching mask. In particular, a wet etching step may be performed that causes the intermediate electrically insulating layer 14 to become recessed and removes the oxide spacers 22 and the sacrificial insulating region 24 from within the groove 18, as illustrated by FIG. 1I. Upon completion of this wet etching step, the mirror backing layer 20 will be supported by the polysilicon electrostatic clamp electrodes 28 and the ledge 12a formed by the silicon wafer 12.

Referring now specifically to FIG. 2, a plan layout schematic of an optoelectronic device having a pop-up mirror therein is provided. As illustrated, the mirror backing layer 20 is mechanically and electrically coupled to the electrically conductive layer 16 by a polysilicon hinge 26 that enables the mirror backing layer 20 to be rotated from the closed position within the opening to an upright and open position. When in the open position, the mirror backing layer 20 may be disposed orthogonally relative to the electrically conductive layer 16. A pair of polysilicon electrostatic clamp electrodes 28 are also provided. These clamp electrodes 28 are attached to the mirror backing layer 20 at contact openings A and B, and are electrically connected to a first portion of the electrically conductive layer 16 (at contact opening D) by the polysilicon hinge 26. As illustrated best by FIGS. 1I and 3, the clamp electrodes 28 extend opposite regions E and F within the electrically conductive layer 16. Respective portions of the silicon nitride layer 17 also extend between the electrically conductive layer 16 and the ends of each clamp electrode 28. These portions of the silicon nitride layer 17 act as a capacitor dielectric material when an electrostatic potential is established between the underlying portion of the electrically conductive layer 16 and the respective clamp electrode 28. This electrostatic potential induces a downward force $F_2$ on the clamp electrodes 28. A nickel frame layer 33 is also provided on the mirror backing layer 20. As determined by the inventors herein, the application of a magnetic field "B" of sufficient strength through the opening 19 will induce an upward force $F_1$. on the nickel frame layer 33 that pulls and rotates the mirror backing layer 20 to a substantially upright position. This upward force induced by the magnetic field "B" can be countered by the opposite electrostatic force $F_2$ established between the clamp electrodes 28 and respective opposing regions E and F of the electrically conductive layer 16 (regions E and F are electrically isolated from region G within the electrically conductive layer 16). Thus, even in the presence of a sufficiently strong magnetic field B, the mirror backing layer 20 may be clamped in a closed position.

Figure 4A:
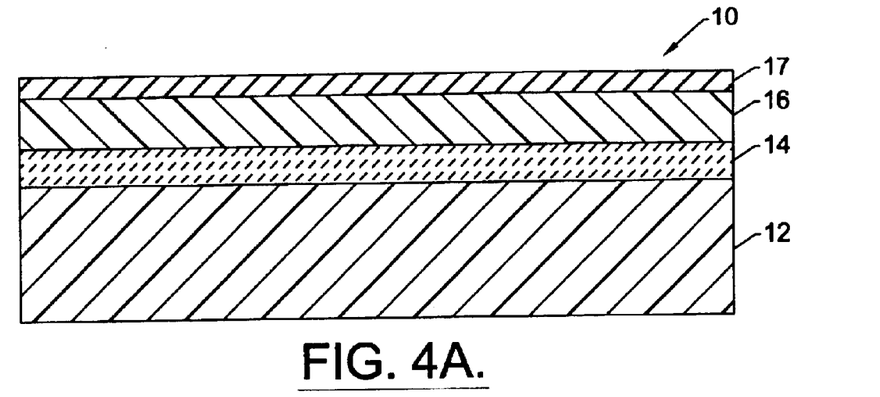
FIGS. 4A–4I are cross-sectional views of intermediate structures, taken along line 4–4' of FIG. 5, that illustrate preferred methods of forming optoelectronic devices having pop-up mirrors therein, according to a second embodiment of the present invention.

Referring now to FIGS. 4A–4I, preferred methods of forming pop-up mirrors according to another embodiment of the present invention include the step of forming a substrate 10. As illustrated by FIG. 4A, the substrate 10 may comprise a monocrystalline silicon wafer 12 having a thickness of greater than about 100 μm and an intermediate electrically insulating layer 14 on an upper surface of the silicon wafer 12. The intermediate electrically insulating layer 14 may be formed by thermally oxidizing the upper surface of the silicon wafer 12. The intermediate electrically insulating layer 14 preferably has a thickness in a range between about 0.1 μm and 0.5 μm. The substrate 10 also preferably comprises an electrically conductive layer 16 of monocrystalline silicon having a thickness in a range between about 10 μm and 100 μm, and more preferably about 50 μm. This electrically conductive layer 16 may have a polished surface and this polished surface may be bonded to the intermediate electrically insulating layer 14 using conventional wafer bonding techniques, for example. Alternatively, the electrically conductive layer 16 may be formed on an upper surface of the intermediate electrically insulating layer 14 using epitaxial lateral overgrowth (ELO) techniques. A silicon nitride layer 17 having a thickness in a range between about 0.1 and 0.5 μm may also be formed on the electrically conductive layer 16.

Figure 4B:
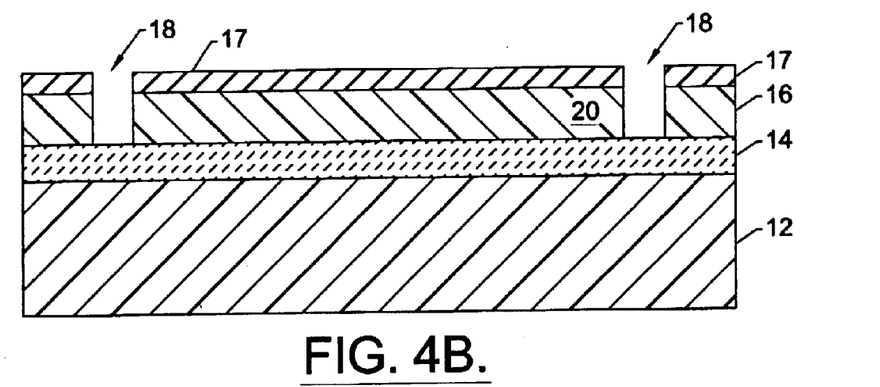
Figure 5:
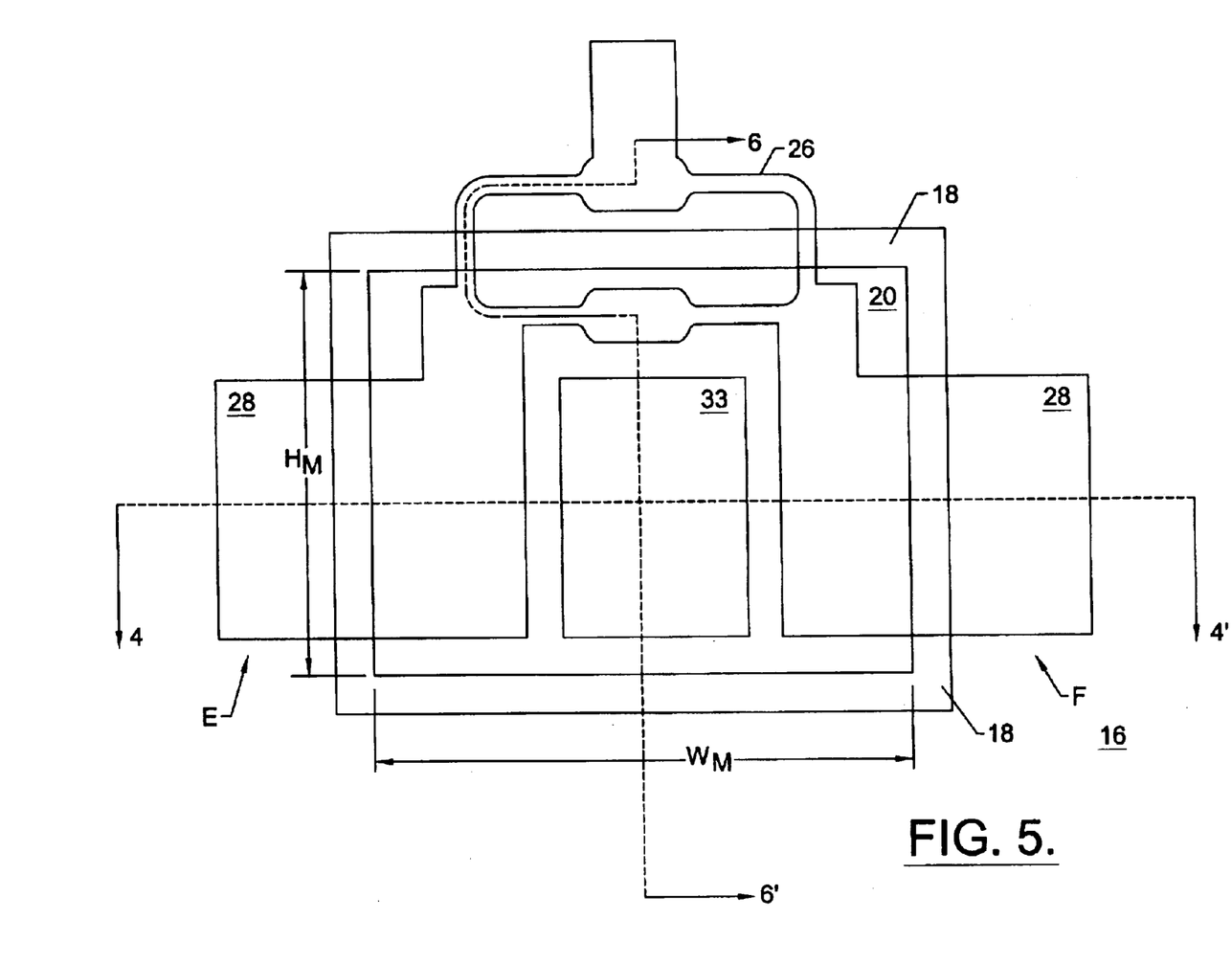
FIG. 5 is a plan layout schematic of an optoelectronic device having a pop-up mirror therein, according to the second embodiment of the present invention.

Referring now to FIGS. 4B and 5, a mirror backing layer 20 may be defined by forming an endless groove 18 that extends through the electrically conductive layer 16 and exposes the intermediate electrically insulating layer 14 which acts as an etch-stop layer. The mirror backing layer 20 may be defined as a rectangular-shaped layer having a width "$W_M$" of about 350 μm and a height "$H_M$" of about 250 μm when viewed in an open position. The endless groove 18 may be formed by selectively etching the electrically conductive layer 16 using a deep reactive ion etching (DRIE) technique that provides a high degree of selectivity and facilitates the formation of a groove 18 having a high aspect ratio. Alternatively, the endless groove 18 may be formed by an anisotropic etching step using a KOH etchant.

Figure 4C:
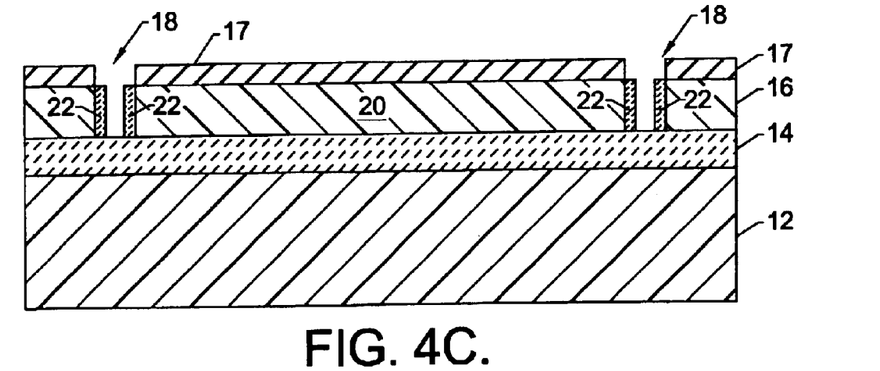

As illustrated by FIG. 4C, a step is then performed to narrow the effective width of the groove 18. This step is preferably achieved by performing a thermal oxidation step to selectively grow oxide spacers 22 on the exposed sidewalls of the electrically conductive layer 16 and the mirror backing layer 20 (using the silicon nitride layer 17 as a thermal oxidation mask). For a groove 18 having a width of about 5 μm, the oxide spacers 22 may be formed to have a thickness of about 2 μm.

Figure 4D:
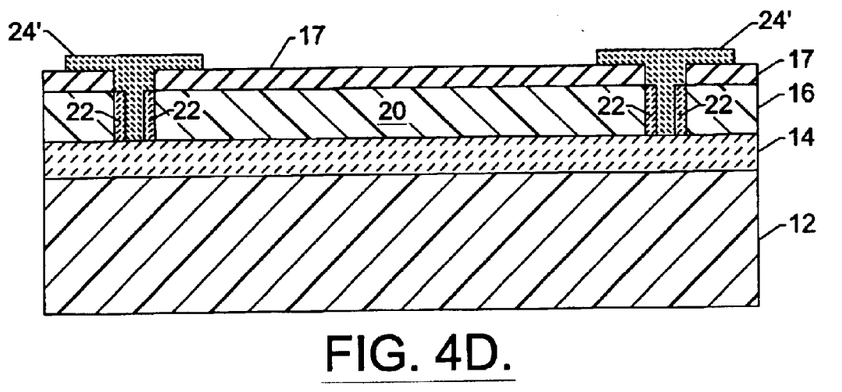
Figure 4E:
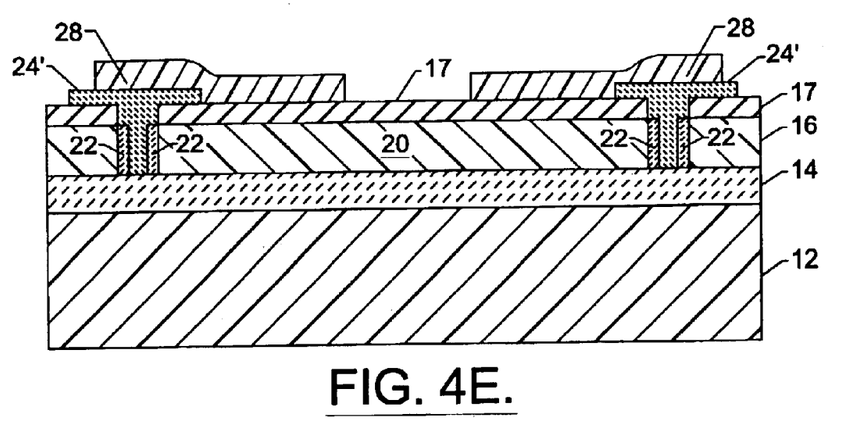

Referring now to FIG. 4D, a step is then performed to fill the remaining opening in the groove 18 with an electrically insulating material by depositing a blanket layer of phosphorus-doped silicate glass (PSG) on the structure of FIG. 4C. This blanket layer is then patterned to define a sacrificial insulating region 24' within the groove 18 and on the surface of the silicon nitride layer 17, as illustrated. Referring now to FIGS. 4E and 5, a blanket layer of polycrystalline silicon having a thickness in a range between about 1 μm and 3 μm (e.g., 2 μm) is then deposited onto the silicon nitride layer 17 and onto the patterned sacrificial insulating region 24'. The blanket layer of polycrystalline silicon is then patterned to define a polysilicon hinge 26 and a pair of polysilicon electrostatic clamp electrodes 28 that are electrically coupled to and contiguous with the hinge 26.

Figure 4F:
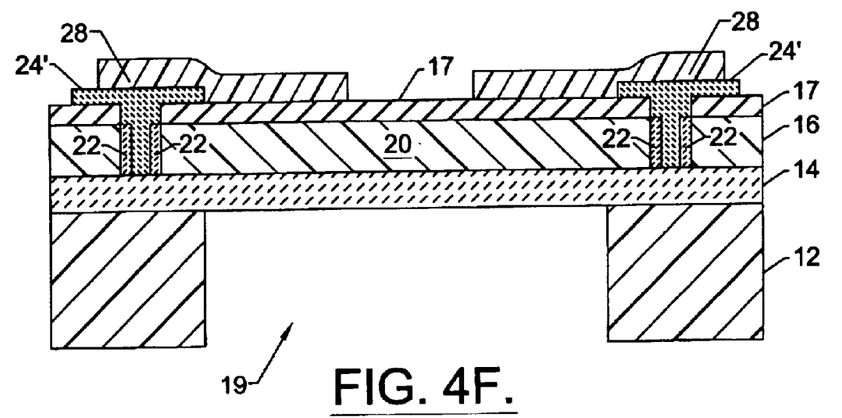
Figure 4G:
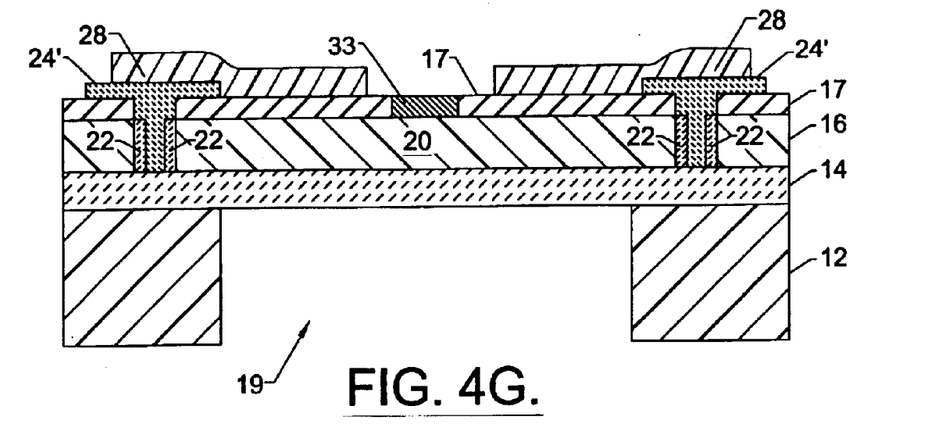

Referring now to FIG. 4F, a backside of the monocrystalline silicon wafer 12 is then etched using a deep reactive ion etching (DRIE) technique, to define an opening 19 in the monocrystalline silicon wafer 12 that exposes the intermediate electrically insulating layer 14. During this DRIE step, the intermediate electrically insulating layer 14 acts as an etch-stop layer. Then, as illustrated by FIGS. 4G and 5, a photolithographically defined etching step is performed on the silicon nitride layer 17 to expose the back surface of the mirror backing layer 20. This etching step is then followed by the step of electroplating a layer of nickel 33 having a thickness in a range between about 5 μm and 30 μm onto the exposed back surface of the mirror backing layer 20. Here, the etching mask that is used during etching of the silicon nitride layer 17 is also used as a mask during the electroplating step.

Figure 4H:
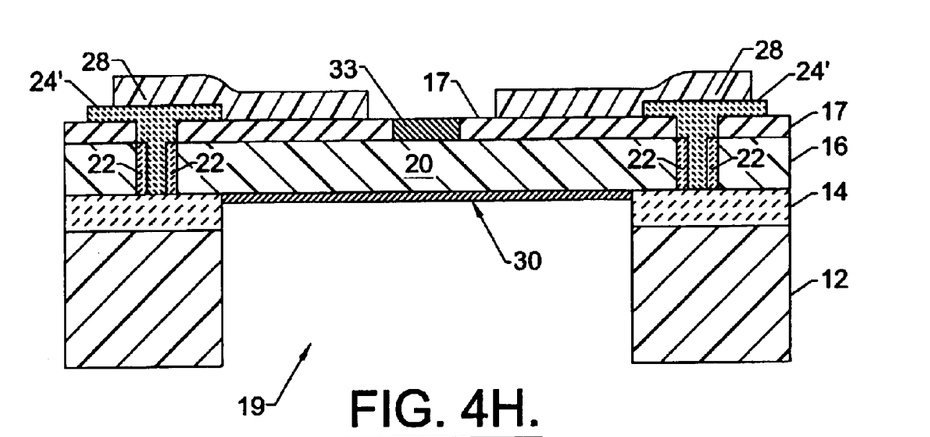

Referring now to FIG. 4H, a conventional etching step is then performed to remove the exposed portion of the intermediate electrically insulating layer 14 from the front polished surface of the mirror backing layer 20. An optically reflective mirror surface 30 is then formed on the front surface of the mirror backing layer 10. This mirror surface 30 may be formed by evaporating a layer of gold onto the front surface of the mirror backing layer 20.

Figure 4I:
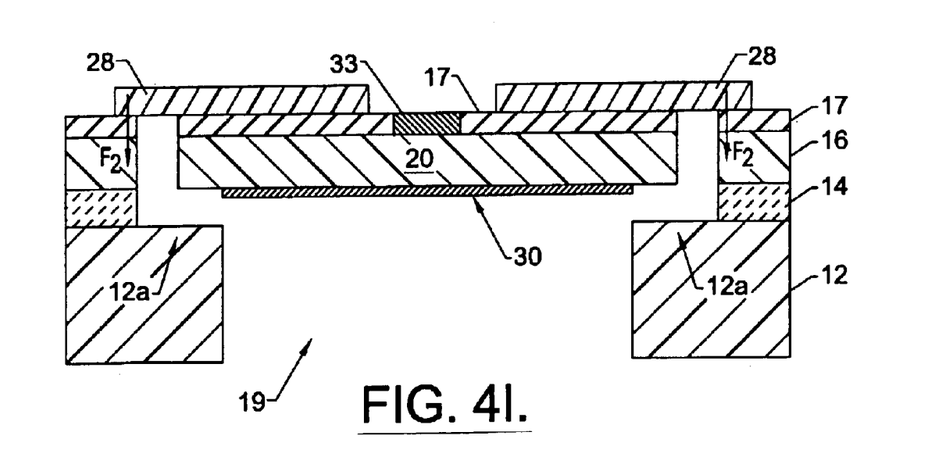

The mirror backing layer 20 is then released by performing a selective etching step using the mirror surface 30 and silicon wafer 12 as an etching mask. In particular, a wet etching step may be performed that causes the intermediate electrically insulating layer 14 to become recessed and removes the oxide spacers 22 and the sacrificial insulating region 24' from within the groove 18 and underneath the electrostatic clamp electrodes 28, as illustrated by FIG. 4I.

Figure 6:
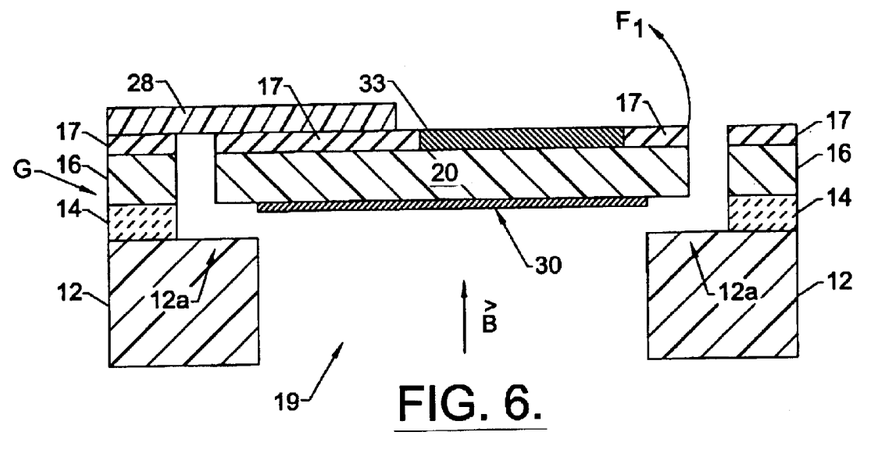
FIG. 6 is a cross-sectional view of the optoelectronic device of FIG. 5, taken along line 6–6'.

Referring now specifically to FIG. 5, a plan layout schematic of an optoelectronic device having a pop-up mirror therein is provided. As illustrated, the mirror backing layer 20 is mechanically coupled to the electrically conductive layer 16 by a polysilicon hinge 26 that enables the mirror backing layer 20 to be rotated from the closed position within the opening to an upright and open position. When in the open position, the mirror backing layer 20 may be disposed orthogonally relative to the electrically conductive layer 16. A pair of polysilicon electrostatic clamp electrodes 28 are also provided. As illustrated best by FIGS. 4I and 6, the clamp electrodes 28 extend opposite regions E and F within the electrically conductive layer 16. Respective portions of the silicon nitride layer 17 also extend between the electrically conductive layer 16 and the ends of each clamp electrode 28. These portions of the silicon nitride layer 17 act as a capacitor dielectric material when an electrostatic potential is established between the underlying portion of the electrically conductive layer 16 and the respective clamp electrode 28. This electrostatic potential induces a downward force $F_2$ on the clamp electrodes 28. A nickel frame layer 33 is also provided on the mirror backing layer 20. As determined by the inventors herein, the application of a magnetic field "B" of sufficient strength through the opening 19 will induce an upward force $F_1$ on the nickel frame layer 33 that pulls and rotates the mirror backing layer 20 to a substantially upright position. This upward force induced by the magnetic field "B" can be countered by the opposite electrostatic force $F_2$ established between the clamp electrodes 28 and respective opposing regions E and F of the electrically conductive layer 16 (regions E and F are electrically isolated from region G within the electrically conductive layer 16). Thus, even in the presence of a sufficiently strong magnetic field B, the mirror backing layer 20 may be clamped in a closed position.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of forming an optoelectronic device, comprising the steps of:
    forming an electrically conductive layer on a substrate having a first electrically insulating layer thereon;
    forming a mirror backing layer from the electrically conductive layer, by forming a groove that extends through the electrically conductive layer and exposes a first surface of the first electrically insulating layer;
    removing a portion of the substrate and corresponding portion of the first electrically insulating layer to expose a front surface of the mirror backing layer;
    forming an optically reflective mirror surface on the front surface of the mirror backing layer; and
    recessing the first electrically insulating layer to expose a portion of the mirror blocking layer that is not covered by the optically reflective mirror surface.

2. The method of claim 1, wherein said step of forming a groove is followed by the step of forming a sacrificial insulating region in the groove.

3. The method of claim 2, wherein said recessing step comprises selectively etching the first electrically insulating layer and the sacrificial insulating region in the groove, using the optically reflective mirror surface as an etching mask.

4. The method of claim 2, wherein said step of forming a sacrificial insulating region in the groove comprises thermally oxidizing at least one sidewall of the mirror backing layer that is exposed by the groove.

5. The method of claim 3, wherein said step of forming a sacrificial insulating region in the groove comprises thermally oxidizing at least one sidewall of the mirror backing layer that is exposed by the groove.

6. The method of claim 3, wherein said step of forming a sacrificial insulating region in the groove comprises the steps of:
    thermally oxidizing at least one sidewall of the mirror backing layer that is exposed by the groove; and then
    depositing a silicate glass layer in the groove.

7. The method of claim 2, wherein said step of forming a sacrificial insulating region in the groove is followed by the step of forming a hinge comprising a flexible material on a back surface of the mirror backing layer and on the sacrificial insulating region.

8. The method of claim 7, wherein said recessing step comprises selectively etching the first electrically insulating layer and the sacrificial insulating region in the groove, to expose the hinge.

9. The method of claim 8, wherein said selectively etching step comprises selectively etching the first electrically insulating layer and the sacrificial insulating region using the optically reflective mirror surface as an etching mask.

10. The method of claim 2, wherein said step of forming a sacrificial insulating region in the groove is followed by the step of forming a polysilicon hinge that extends on the sacrificial insulating region and is attached to a back surface of the mirror backing layer.

11. The method of claim 10, wherein the groove defines a polygon-shaped mirror backing layer; and wherein said step of forming a polysilicon hinge comprises forming a polysilicon hinge that is attached to a portion of the electrically conductive layer extending outside a periphery of the groove.

12. The method of claim 6, wherein said step of forming a sacrificial insulating region in the groove is followed by the step of forming a polysilicon hinge that extends on the silicate glass layer and is attached to the back surface of the mirror backing layer.

13. The method of claim 12, wherein said step of forming a polysilicon hinge comprises forming a polysilicon hinge that is attached to a portion of the electrically conductive layer extending outside a periphery of the groove.

14. The method of claim 13, wherein said recessing step comprises selectively etching the first electrically insulating layer, the thermally oxidized sidewall of the mirror backing layer and the silicate glass layer, to expose the polysilicon hinge.

15. The method of claim 14, wherein said selectively etching step comprises selectively etching the first electrically insulating layer using the optically reflective mirror surface as an etching mask.

16. The method of claim 1, wherein the electrically conductive layer comprises a monocrystalline silicon layer having a thickness greater than about 10 $\mu$m; and wherein said step of forming a mirror backing layer comprises the step of selectively deep reactive ion etching the monocrystalline silicon layer to form a mirror backing layer.

17. The method of claim 11, further comprising the step of forming a first electrostatic clamp electrode that extends across the groove and is attached to the back surface of the mirror backing layer.

18. The method of claim 17, wherein said step of forming a mirror backing layer from the electrically conductive layer is preceded by the step of forming a silicon nitride layer on the electrically conductive layer; and wherein said step of forming a polysilicon hinge is preceded by the step of selectively etching the silicon nitride layer to expose a first portion of the electrically conductive layer and expose first and second portions of the back surface of the mirror backing layer.

19. The method of claim 18, wherein said steps of forming a polysilicon hinge and forming a first electrostatic clamp electrode comprise depositing a polysilicon layer on the exposed first portion of the electrically conductive layer and on the exposed first and second portions of the back surface of the mirror backing layer.

20. The method of claim 19, wherein said step of forming an optically reflective mirror surface comprises evaporating or sputtering a layer of gold on the front surface of the mirror backing layer.

21. The method of claim 1, wherein said step of forming an optically reflective mirror surface comprises evaporating or sputtering a layer of gold on the front surface of the mirror backing layer.

22. The method of claim 16, wherein the substrate comprises a monocrystalline silicon substrate having a thickness greater than 100 µm; and wherein said step of removing a portion of the substrate comprises selectively etching the monocrystalline silicon substrate using a deep reactive ion etching technique.

23. The method of claim 11, wherein the electrically conductive layer comprises a monocrystalline silicon layer having a thickness greater than about 10 µm; and wherein said step of forming a mirror backing layer comprises forming a mirror backing layer from the electrically conductive layer by selectively etching the electrically conductive layer using a deep reactive ion etching technique.

24. The method of claim 23, wherein the substrate comprises a monocrystalline silicon substrate having a thickness greater than 100 µm; and wherein said step of removing a portion of the substrate comprises selectively etching the monocrystalline silicon substrate using a deep reactive ion etching technique.

25. The method of claim 1, wherein said step of removing a portion of the substrate is followed by the step of electroplating a layer of nickel onto a back surface of the mirror backing layer.

26. The method of claim 9, wherein said step of removing a portion of the substrate is followed by the step of electroplating a layer of nickel onto the back surface of the mirror backing layer.

27. The method of claim 19, wherein said step of removing a portion of the substrate is followed by the steps of:
   selectively etching the silicon nitride layer to expose a third portion of the back surface of the mirror backing layer; and
   electroplating a layer of nickel onto the third portion of the back surface of the mirror backing layer.

28. The method of claim 20, wherein said step of removing a portion of the substrate is followed by the steps of:
   selectively etching the silicon nitride layer to expose a third portion of the back surface of the mirror backing layer; and
   electroplating a layer of nickel onto the third portion of the back surface of the mirror backing layer.

29. The method of claim 22, wherein said step of removing a portion of the substrate is followed by the step of electroplating a layer of nickel onto a back surface of the mirror backing layer.

30. A method of forming an optoelectronic device, comprising the steps of:
   forming an electrically conductive layer on a first surface of a substrate;
   forming a mirror backing layer from the electrically conductive layer by forming a groove that extends through the electrically conductive layer;
   removing a portion of the substrate at a second surface thereof extending opposite the first surface, to expose a front surface of the mirror backing layer; and
   forming an optically reflective mirror surface on the front surface of the mirror backing layer.

31. The method of claim 30, wherein the electrically conductive layer comprises a monocrystalline silicon conductive layer having a thickness of greater than about 10 µm; and wherein said step of forming a mirror backing layer comprises etching a groove in the monocrystalline silicon conductive layer using a deep reactive ion etching technique.

32. The method of claim 30, wherein the substrate comprises a supporting layer of monocrystalline silicon having a thickness of greater than about 100 µm; and wherein said step of removing a portion of the substrate comprises etching through the supporting layer of monocrystalline silicon using a deep reactive ion etching technique.

33. The method of claim 31, further comprising the step of forming a polysilicon hinge that is attached to a back surface of the mirror backing layer and is attached to the electrically conductive layer.

34. The method of claim 33, wherein said step of forming an optically reflective mirror surface comprises evaporating or sputtering a layer of gold onto the front surface of the mirror backing layer.

35. The method of claim 34, further comprising the step of electroplating a layer of nickel onto the back surface of the mirror backing layer.

36. The method of claim 33, wherein said step of forming a polysilicon hinge comprises forming a polysilicon electrostatic clamping electrode that is attached to the back surface of the mirror backing layer and overlaps the groove.

37. The method of claim 30, wherein said step of removing a portion of the substrate is preceded by the step of thermally oxidizing at least one sidewall of the mirror backing layer that is exposed by the groove.

38. The method of claim 34, wherein said step of forming a polysilicon hinge comprises forming a polysilicon electrostatic clamping electrode that is attached to the back surface of the mirror backing layer and overlaps the groove.

39. The method of claim 38, wherein said step of removing a portion of the substrate is preceded by the step of thermally oxidizing at least one sidewall of the mirror backing layer that is exposed by the groove.

40. A method of forming an optoelectronic device, comprising the steps of:
   forming a monocrystalline silicon mirror backing layer having a thickness greater than about 10 µm, adjacent a first surface of a silicon-on-insulator substrate;
   forming a polysilicon hinge that mechanically couples the mirror backing layer to the silicon-on-insulator substrate;
   removing a portion of the silicon-on-insulator substrate at a second surface thereof using a deep reactive ion etching technique, to expose a front surface of the mirror backing layer, and
   forming an optically reflective mirror surface on the front surface of the mirror backing layer.

41. The method of claim 40, wherein the silicon-on-insulator substrate comprises a monocrystalline silicon conductive layer having a thickness of greater than about 10 µm; and wherein said step of forming a monocrystalline silicon mirror backing layer comprises etching a groove in the monocrystalline silicon conductive layer using a deep reactive ion etching technique.

42. The method of claim 40, wherein said step of forming an optically reflective mirror surface comprises evaporating or sputtering a layer of reflective material onto the front surface of the mirror backing layer.

43. The method of claim 42, wherein the layer of reflective material comprises a material selected from the group consisting of gold and aluminum.

44. The method of claim 43, further comprising the step of electroplating a layer of nickel onto the back surface of the mirror backing layer.

45. The method of claim 40, further comprising the step of electroplating a layer of nickel onto the back surface of the mirror backing layer.

46. The method of claim 41, wherein said step of forming a polysilicon hinge comprises forming a polysilicon electrostatic clamping electrode that is attached to a back surface of the mirror backing layer and overlaps the groove.

47. The method of claim 41, wherein said step of removing a portion of the silicon-on-insulator substrate is preceded by the step of thermally oxidizing at least one sidewall of the mirror backing layer that is exposed by the groove.

48. The method of claim 41, wherein said step of forming an optically reflective mirror surface comprises evaporating or sputtering a layer of reflective material onto the front surface of the mirror backing layer; and wherein said step of forming a polysilicon hinge comprises forming a polysilicon electrostatic clamping electrode that is attached to a back surface of the mirror backing layer and overlaps the groove.

49. The method of claim 48, wherein said step of removing a portion of the silicon-on-insulator substrate is preceded by the step of thermally oxidizing at least one sidewall of the mirror backing layer that is exposed by the groove.

* * * * *